Patented July 2, 1929.

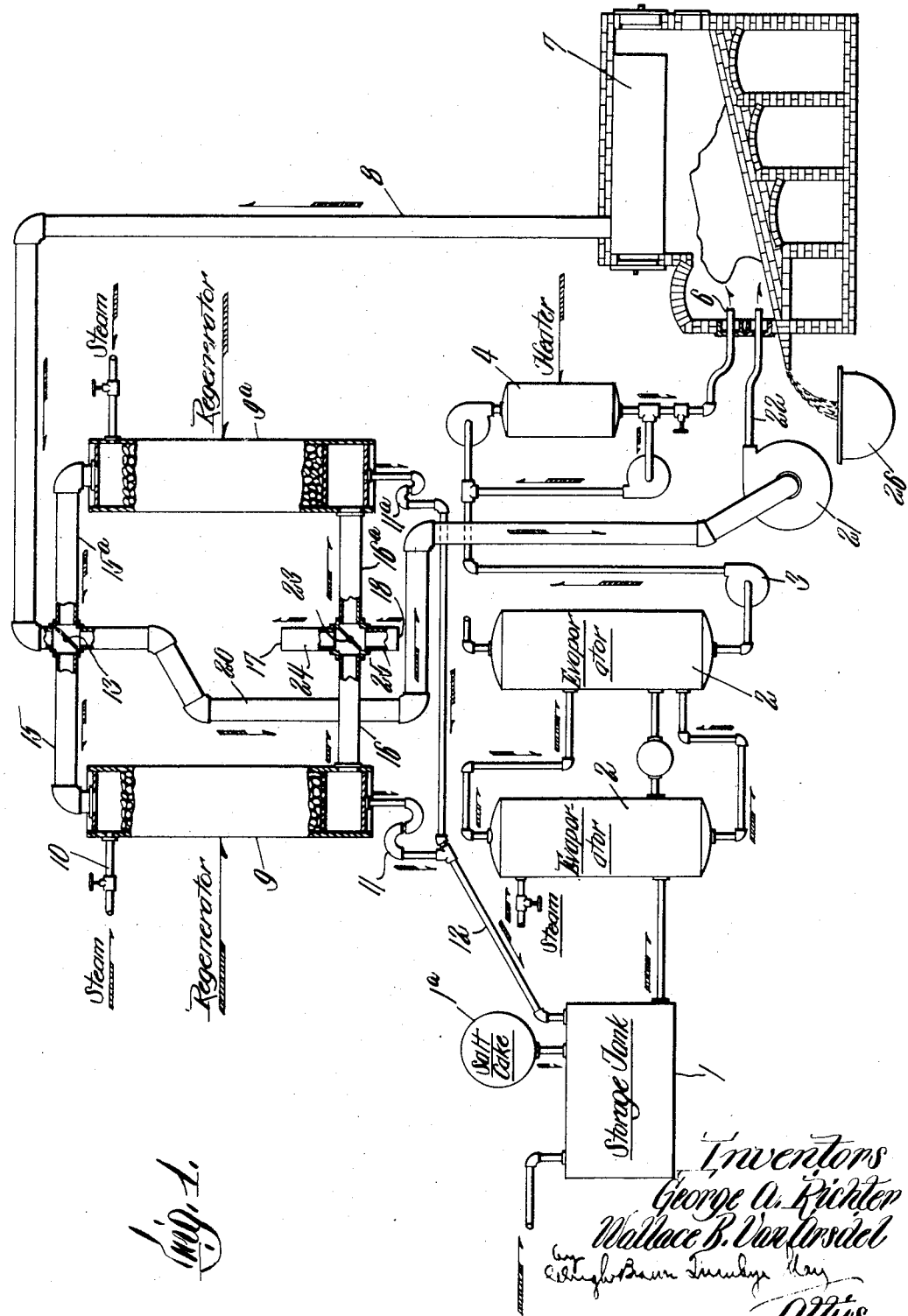

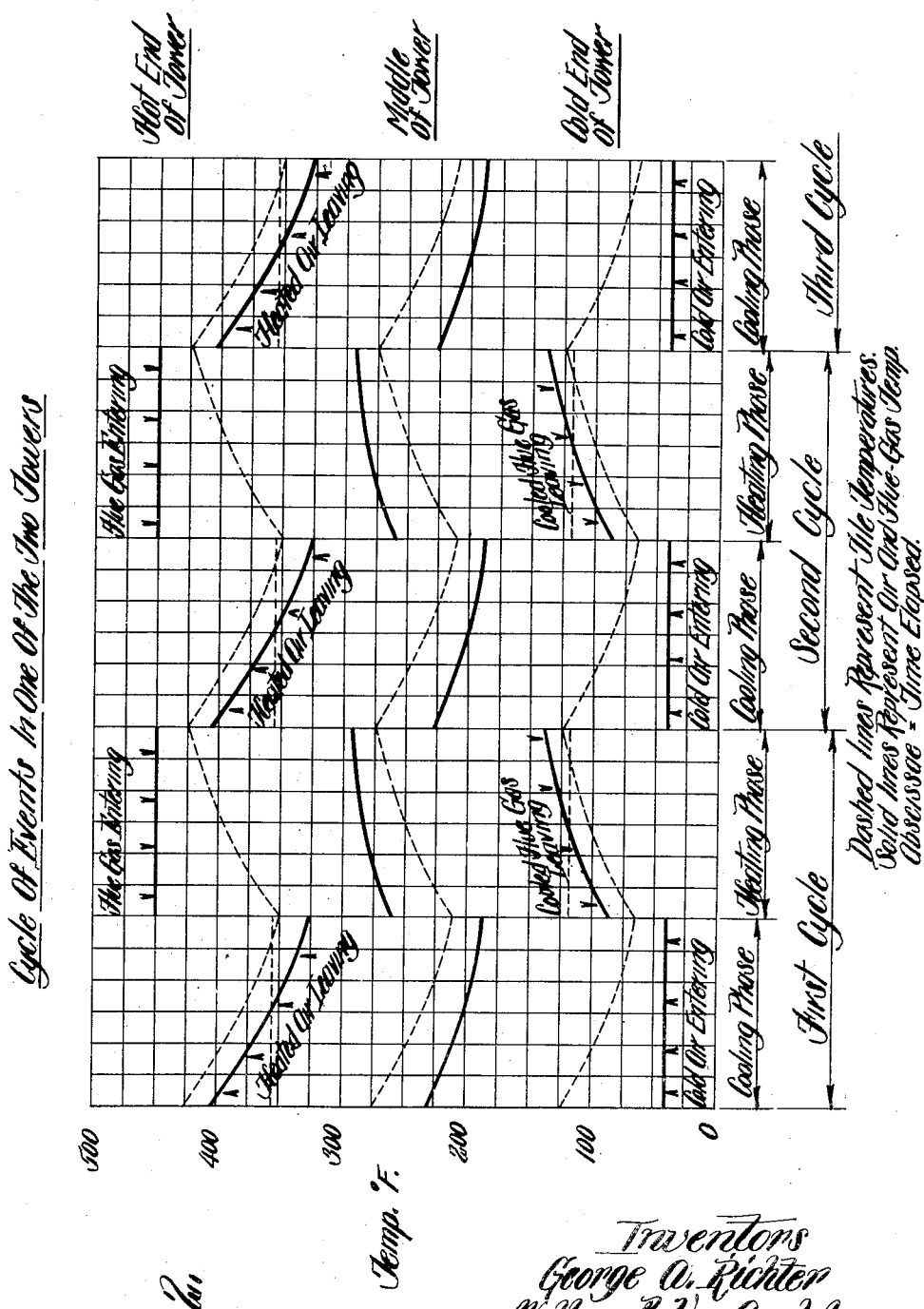

1,719,130

UNITED STATES PATENT OFFICE.

GEORGE A. RICHTER AND WALLACE B. VAN ARSDEL, OF BERLIN, NEW HAMPSHIRE, ASSIGNORS TO BROWN COMPANY, OF BERLIN, NEW HAMPSHIRE, A CORPORATION OF MAINE.

PROCESS FOR RECOVERING HEAT AND CHEMICALS.

Application filed December 16, 1925. Serial No. 75,742.

This invention in its broadest aspects relates to the recovery of chemicals and heat from hot waste gases containing valuable and recoverable chemical constituents. More particularly, this invention is concerned with the recovery of chemicals and heat from the waste gases arising from the smelting operation of spent liquors resulting from the liberation of fiber from raw cellulosic material. While we shall describe the process as applied specifically to the kraft or sulphate process of fiber liberation so-called, it is to be understood that this is by the way of example only, and that the process may be applied successfully to other processes of fiber liberation, such as the sulphite and soda processes and their various modifications, and to any other process wherein a material is subjected to a heating operation and results in the generation of hot waste gas containing valuable and recoverable compounds.

In the kraft process, the hot gases from the recovery retorts or furnaces contain considerable quantities of sublimed sodium salts in the form of sodium sulphate, sodium carbonate, sodium sulphide, together with carbon dioxide, sulphur dioxide, and a relatively large amount of water vapor. The recovery of the inorganic salts in such gases is occasionally practised by means of electrostatic precipitation, such as a Cottrell precipitator, but such recovery entails the loss of the $SO_2$ constituent in the gas, as well as its heat content.

In application, Serial No. 73,194 filed December 4, 1925, by George A. Richter, a process is disclosed which comprises the recovery of such salts, together with the sulphur dioxide, by scrubbing the gases with an aqueous liquor, such as black spent liquor or water, and the subsequent reintroduction of such recovered constituents into the recovery furnace, together with the concentrated and evaporated black liquor. Such a process entails certain disadvantages together with those which were discussed in the application for patent referred to, and also results in the loss of the heat content of the gases.

In accordance with the present invention, however, not only are such valuable constituents recovered from the retort gases in a highly efficient manner, but the heat content of the gases is also recovered and is utilized for preheating a suitable cool medium which it is desired to preheat, such as free air, which may be employed for supporting the combustion operation in the recovery furnace, or for any other desired purpose. This is accomplished by periodically passing the retort gases and free air through one and then through another of a pair of regenerators or condensing towers filled with inert interstitial or surface material, such as tile, spiral brick, field rock, or the like. Thus, in passing the hot retort gases through the tower, they are cooled below their dew point, that is, the temperature at which the vapor contained therein will condense. The condensate thus formed immediately dissolves the sublimed sodium salts contained in the gases. In other words, the sublimed sodium salts which are associated with the condensing water vapor in the retort gases in the form of a fine fog or mist, dissolve simultaneously with the condensation of the vapor in the condensate. The condensate is relatively small in amount and quickly becomes rather concentrated in sodium salts, including sodium carbonate, and thus readily serves as an efficient absorbing medium for the sulphur dioxide contained in the gases. The effluent from the tower is moderately concentrated in the various sodium compounds, including sodium sulphate, sodium sulphite, sodium sulphide and sodium carbonate, and may be reintroduced together with the evaporated and concentrated black liquor into the recovery retort, and the sodium and sulphur constituents used for making up the losses occasioned in the complete cycle commencing with fresh digesting liquor and resulting in the recovered compounds employed for making up a fresh digesting liquor. Thus in a mill where the sodium and sulphur constituents are added in the form of sodium sulphate, since the losses of sulphur and sodium constituents which occur in the cycle represent mechanical or leakage losses only, the effluent smelt from the retort consists preponderantly or substantially in entirety of sodium sulphide, and after the solution of the smelt with the desired amount of water to form a fresh digesting liquor in a dissolving tank may be employed directly as the digesting liquor for the liberation of fiber from raw cellulosic material to yield a pulp substantially equivalent to the usual commercial kraft pulp. Such procedure makes possible the omission of the usual causticization step of the smelt liquor, which is practised in the usual kraft mill, wherein the smelt contains a substantial quantity of sodium carbonate owing to the waste of the sulphur constituent in the form of sulphur dioxide from the retort gas. Since sodium carbonate has practically no fiber-liberating action, it is converted by causticization into caustic soda. However, if a certain percentage of caustic soda is desired in the smelt from the furnace, the loss in sodium constituent in the practice of the present invention may be made up by the addition of caustic soda to the smelt liquor, and the loss in sulphur constituent may be made up by the addition of free sulphur, together with the evaporated and concentrated black liquor into the furnace.

After the inert surface material in one of the towers has been heated to a temperature at which condensation of the vapor and recovery of the chemicals in the retort gases is no longer efficiently effected, the flow of gases is diverted to the second tower, which has been reduced to its initial low temperature by the passage and preheating of free air therethrough. The air which is to be preheated is now passed through the tower containing the heated interstitial material, and the heated material is thus cooled and gives up its heat content to the air. Such preheated air, when employed in the combustion retort, readily and efficiently not only promotes the smelting operation, but makes possible the use of less extraneous heat for maintaining smelting and combustion temperatures within the furnace, and may result in an increased output of the steam boiler operated by the furnace.

With the foregoing and other advantageous features in view, a more complete understanding of the present invention may be gained from the following description thereof, when considered in conjunction with the accompanying drawings, in which Figure 1 represents more or less diagrammatically and conventionally an apparatus for practising the present invention.

Figure 2 represents graphically the cycle of events in one of the two towers.

Referring to the drawings, 1 represents a storage tank into which the spent black liquor separated from the pulp in previous digestion is delivered. To this spent liquor, if losses in sodium and sulphur constituents are being made up by the addition of sodium sulphate (salt cake) prior to the smelting operation, such sodium sulphate may be added in the form of a concentrated solution from the tank 1ª. If desired, however, the sodium sulphate may be introduced into the furnace and the losses in sodium and sulphur constituent may be replenished in any other suitable manner. A portion of the aqueous content of the black spent liquor is then removed by passing the liquor through a multiple-effect evaporating system 2, 2, here conventionally represented as two-effect. Then, by the process described in the Moore and Quinne Patent No. 1,326,414, the evaporated and concentrated black liquor from the evaporating system is withdrawn by a pump 3 and delivered to a circulating system indicated as a whole at 4, wherein the liquor is heated to a high temperature and maintained under sufficient pressure so that an explosive or disrupting effect is generated therein when it is discharged through nozzles 6 into a combined boiler and smelting recovery furnace or retort, indicated at 7. The combustible content of the liquor is consumed and its inorganic constituents are smelted in the reducing atmosphere in the furnace, liberating gases containing water vapor resulting from the vaporization of the water introduced with the black liquor, together with sublimed sodium salts and sulphur dioxide.

The effluent smelt from the furnace is discharged into the desired amount of water contained in a dissolving tank 26 and is utilized in the liberation of fiber from raw cellulosic material.

These gases pass upwardly through a flue 8 and may then be conducted through either one of two branches 15, 15ª, by means of a reversible throw butterfly valve 13, inserted therebetween, with which branches, respectively, only one of a pair of condensing towers or regenerators, 9 and 9ª may be made to communicate. While a flow of retort gases is maintained through one tower, air is circulated through and preheated in the other tower, which has previously been heated by retort gases, and the preheated air is drawn through a conduit 20 and discharged into the furnace 7, through the conduit 22, by means of a blower 21. The preheated air serves more efficiently to support the combustion and smelting operation carried out in the furnace, as previously indicated.

Provision is made to discharge the tail retort gases accumulating at the bottom of the towers 9, 9ª, respectively, through the conduits 16 and 16ª, which, as shown, are joined to the open conduits 24 and 25 in the form of a cross and may be completely closed off from one another by means of a reversible throw butterfly valve 23. The cross comprises the openings 17 and 18, each of which, by the proper manipulation of the valve 23, may be made to serve not only as an exit for the tail gases from its respective tower, but also as the inlet for the free air which is withdrawn from the atmosphere and preheated in its respective tower prior to introduction into the furnace.

The condensation of the water vapor in the tower is, of course, accompanied with tremendous decrease in volume of gas (approximately 1000 times its volume) resulting in a mass movement of the hot gas to the cooled surface material to compensate for the loss in volume of steam due to such condensation. This motion carries the dust, or fine particles of sublimed sodium compounds, into immediate contact with the condensate or water film on the surface material, resulting in the absorption and recovery of the sodium compounds and the production of a moderately strong solution of sodium compounds, including sodium carbonate, which simultaneously reacts with and dissolves the sulphur dioxide swept thereonto by the mass movement of the gases. The successful operation within the condensing tower may be attributed to the treatment of moist gases containing a high percentage of water vapor, since if dry gases were employed and passed by a water film, there would be a relatively stagnant gas film between the water film and the gas moving thereby, and thus relatively few gas particles would come in contact with the water film and there would be only a relatively slight absorption or solution by the film of the constituents contained in such gases. With this feature in mind, in certain instances it may be found advantageous and economical to introduce into the towers together with the moist retort gases a certain amount of additional water vapor in the form of steam from valved conduits 10 and 10ª. Such an expedient necessitates the use of a larger bulk of surface material, but results in a more efficient recovery of chemicals. Moreover, a large portion of the heat content of such introduced steam is recovered. Not only, however, is the rate of absorption or solution within the tower greatly increased because of the condensation of vapor contained therein, but a similar result is obtained with respect to increased heat conductivity or film coefficient between gas and surface material. Thus, whereas the film coefficient between dry gases and surface material may be 3 B. t. u. per hour per square foot per degree temperature difference, that for moist gases from which water vapor is condensing on the surface material may be 6, 10, 25, 100, or more, B. t. u., depending on their vapor or moisture content.

The condensed effluent from the tower 9 is removed through a gooseneck pipe 11, and from the tower 9ª through a similar pipe 11ª, and delivered through the pipe 12 into the storage tank 1.

In Figure 2, we have graphically illustrated the cycle of events which occurs in one of the two towers during the heating phase or period, that is, while the retort gases are being passed therethrough and giving up their heat content to the surface material, and during the cooling phase, that is, while the flow of gases has been diverted to the other tower and air which is utilized for supporting combustion in the recovery furnace is being passed therethrough and preheated while cooling or conditioning the inert surface material. The ordinates of the curves drawn represent temperatures of surface material and retort gases and of surface material and air, at various points in the tower, during a heating and cooling phase, and the abscissæ represent time elapsed during the phases. In the graph, the retort gases are designated as "flue gas" and the surface material as "tile." In the instant case, it is assumed that the temperature of the retort gases is approximately 450° F., and the temperature of the free air is 40° F. Thus, during the heating phase the cooled retort gas emerges during the heating phase at an average temperature of about 120° F., and during the cooling phase the heated free air emerges at an average temperature of about 355° F. The change or fluctuation of temperatures during a complete cycle is indicated at three points in the tower, namely, the hot or upper end, the cold or lower end, and the central portion.

From the foregoing, it will be seen that in order to obtain the results herein indicated, the apparatus must be constructed and arranged for the downward passage of the retort gases through the towers, so that the hottest portion of the tower is its upper end, and the coldest portion its lower end. Assuming, now, that the dew point or condensation temperature of the retort gases is about 180° F., no condensation takes place until the gases are reduced below 180° F. On the other hand, if in such case the hot retort gases were caused to pass upwardly through the tower, the condensate formed at the upper, cooler portion would fall on the hotter surface material at the lower portion and tend to be boiled off or evaporated by contact therewith, thus lowering the temperature of the surface material. Recondensation would then again occur at the upper portion of the tower, and the result would be that the exit retort gases from the tower would rapidly rise above 180° F., or their condensation point, and condensation and recovery of their heat and valuable chemical content would not be effected. By employing the downward flow of the retort gases and the upward flow of the free air as described, a very effective operation and recovery may be effected. Of course, only a portion of the tower is actually effective for scrubbing the gases, but no instability due to reevaporation within the tower is encountered. Moreover, the area of surface material which is actually wet or covered with condensate is much greater than might be expected from the small temperature drop (180° F. to 120° F.), but the heat of condensation of water vapor is so large relatively to the sensible heat of dry retort gas, that a relatively large bulk of surface material is necessary to remove such heat.

It should be obvious that while we have described a system comprising two regenerator towers, this was by the way of illustration only, and that the same principle of recovery may be embodied in a greater number of towers, certain towers being periodically or intermittently heated by retort gases and serving as condensers, and then serving as regenerators for preheating a suitable cooling medium, such as air, prior to introduction into the recovery furnace or utilization for any other desired purpose, while being cooled or conditioned thereby for the cooling of other retort gases.

Moreover, as previously stated, the recovery operation herein outlined is not intended to be limited to the kraft or sulphate process only, but may be applied equally as well in any process, such as in a sodium base sulphite mill wherein the spent liquors resulting from digestion are subjected to a regenerating operation in a combustion retort. The gases and sublimed sodium compounds resulting in the combustion operation may be recovered as herein described, and the effluent liquor from the regenerator towers in such case may be passed directly to the acid system, instead of reintroducing such effluent, together with concentrated spent liquor, into the recovery furnace. In fact, the principle herein described may be applied in any plant wherein hot gases are produced which contain recoverable water-soluble chemicals. Such gases may be passed through a system such as herein described, and the heat content and chemical constituents contained therein may be recovered. In certain cases where such waste gases contain insufficient vapor to allow an efficient recovery of chemicals, water vapor in the form of steam may be commingled with the gases prior to passage through the condensing towers or regenerators.

We again desire to have it understood that the accompanying drawings are diagrammatic and conventional, no attempt having been made to show the actual size relationship between the various instrumentalities, or their true relative locations. For the sake of clarity in the drawings, certain details of construction have been omitted, but it is of course obvious that devices for maintaining a flow through the system and for controlling the process will be supplied where necessary.

What we claim is:

1. A process of recovering chemicals and heat from the gases arising from the combusting and smelting operation of spent liquor resulting from the digestion of cellulosic materials, which comprises passing said gases periodically through one mass of inert interstitial material and then through another similar mass, thereby causing a condensation of the water vapor contained therein and a solution of the soluble compounds in the condensate; recovering and employing said condensate solution for the preparation of a fresh digesting liquor; and abstracting the heat content from and conditioning one mass for cooling other gases during the period of passage of such heated gases through the other mass.

2. A process of recovering chemicals and heat from the gases arising from the combusting and smelting operation of spent liquor resulting from the digestion of cellulosic materials, which comprises passing said gases during periods through one mass of inert interstitial material and then through another similar mass, thereby causing a condensation of the water vapor contained therein and a solution of the soluble compounds; recovering and employing said condensate solution for the preparation of a fresh digesting liquor; and abstracting the heat content from and conditioning one mass for cooling other gases during the period of passage of such heated gases through the other mass, by passing air therethrough, thereby heating said air.

3. A process of recovering chemicals and heat from the gases arising from the combusting and smelting operation of spent liquor resulting from the digestion of cellulosic materials, which comprises passing said gases during periods through one mass of inert interstitial material and then through another similar mass, thereby causing a condensation of the water vapor contained therein and a solution of the soluble compounds; recovering and employing said condensate solution for the preparation of a fresh digesting liquor; abstracting the heat content from and conditioning one mass for cooling other gases during the period of passage of such heated gases through the other mass, by passing air therethrough, thereby heating said air; and utilizing said heated air for supporting the combustion and smelting of the spent liquor.

4. A process of recovering chemicals and heat from the gases arising from the combusting and smelting operation of spent liquors resulting from the digestion of cellulosic material, which comprises passing said gases during periods alternately through separate confined masses of inert interstitial material, thereby causing a condensation of the water vapor contained therein and a solution of the soluble compounds in the condensate; recovering and smelting said condensate solution together with the spent liquor; abstracting the heat content from and conditioning one mass for cooling other heated gases during the period of passage of such heated gases through the other mass by passing air therethrough, thereby heating said air; and utilizing said heated air for supporting the combustion of the combustible content of said spent liquor.

5. A process which comprises smelting spent liquor resulting from the digestion of cellulosic materials to produce smelt gases having a temperature of about 450° F. and containing the water vapor and water-soluble chemical compounds liberated during smelting, passing said gases periodically through one mass of inert interstitial material and then through another similar mass, thereby causing a condensation of the water vapor contained therein and a solution of the soluble compounds in the condensate, recovering and employing said condensate solution for the preparation of a fresh digesting liquor, and abstracting the heat content from and conditioning one mass for cooling other gases during the period of passage of such heated gases through the other mass by passing air therethrough, and controlling the passage of such air through the mass to produce an average temperature of about 355° F. therein.

In testimony whereof we have affixed our signatures.

GEORGE A. RICHTER.
WALLACE B. VAN ARSDEL.